(12) United States Patent
Gauthier et al.

(10) Patent No.: US 8,273,819 B2
(45) Date of Patent: Sep. 25, 2012

(54) NON-GELLABLE AND PUMPABLE CONCENTRATED BINDER FOR BITUMEN/POLYMER

(75) Inventors: Gilles Gauthier, Vourles (FR); Guillaume Dulac, Saint-Genis Laval (FR)

(73) Assignee: Total Raffinage Marketing, Puteaux (FR)

( * ) Notice: Subject to any disclaimer, the term of this patent is extended or adjusted under 35 U.S.C. 154(b) by 374 days.

(21) Appl. No.: 12/666,202

(22) PCT Filed: Jun. 25, 2008

(86) PCT No.: PCT/FR2008/000896
§ 371 (c)(1),
(2), (4) Date: Dec. 22, 2009

(87) PCT Pub. No.: WO2009/016281
PCT Pub. Date: Feb. 5, 2009

(65) Prior Publication Data
US 2011/0319533 A1    Dec. 29, 2011

(30) Foreign Application Priority Data
Jun. 26, 2007 (FR) ..................... 07 04564

(51) Int. Cl.
*C08K 5/01* (2006.01)
(52) U.S. Cl. ......................... 524/484; 524/68
(58) Field of Classification Search ............ 528/68, 528/484–486; 524/68, 484–486
See application file for complete search history.

(56) References Cited

U.S. PATENT DOCUMENTS

| 3,249,567 A * | 5/1966 | Vigneault .................. 524/69 |
|---|---|---|
| 3,997,354 A | 12/1976 | Pivette et al. |
| 4,145,322 A | 3/1979 | Maldonado et al. |
| 4,567,222 A | 1/1986 | Hagenbach et al. |
| 5,078,905 A | 1/1992 | Trinh et al. |
| 5,120,777 A | 6/1992 | Chaverot et al. |
| 5,348,644 A | 9/1994 | Maroy et al. |
| 5,414,029 A | 5/1995 | Lemoine et al. |
| 5,428,085 A | 6/1995 | Burel et al. |
| 5,632,884 A | 5/1997 | Jamois et al. |
| 5,703,148 A * | 12/1997 | Jolivet et al. .................. 524/62 |
| 5,759,250 A | 6/1998 | Malot et al. |
| 5,880,185 A | 3/1999 | Planche et al. |
| 6,020,404 A | 2/2000 | Planche et al. |
| 6,087,420 A | 7/2000 | Planche et al. |
| 6,136,898 A * | 10/2000 | Loza et al. .................. 524/69 |
| 6,156,827 A | 12/2000 | Lemoine et al. |
| 6,158,920 A | 12/2000 | Malot |
| 6,159,279 A | 12/2000 | Malot et al. |
| 6,767,957 B2 | 7/2004 | Lemoine et al. |
| 6,927,248 B2 | 8/2005 | Lemoine et al. |
| 7,399,402 B2 | 7/2008 | Olivier et al. |
| 7,534,924 B2 | 5/2009 | Lemoine et al. |
| 7,577,061 B2 | 8/2009 | Williamson et al. |
| 2002/0052431 A1 | 5/2002 | Lemoine et al. |
| 2002/0052432 A1 | 5/2002 | Lemoine et al. |
| 2008/0308007 A1 | 12/2008 | Lapalu et al. |
| 2009/0030118 A1 | 1/2009 | Lapalu et al. |

FOREIGN PATENT DOCUMENTS

| EP | 0 020 203 | 12/1980 |
|---|---|---|
| EP | 0 360 656 | 3/1990 |
| FR | 2 849 047 | 6/2004 |
| FR | 2 849 048 | 6/2004 |
| FR | 1 572 807 | 9/2005 |
| FR | 1 576 058 | 9/2005 |
| GB | 414336 | 8/1934 |
| JP | 58-204203 | 11/1983 |

* cited by examiner

*Primary Examiner* — Peter Szekely
(74) *Attorney, Agent, or Firm* — Harness, Dickey & Pierce, P.L.C.

(57) ABSTRACT

The present disclosure relates to a concentrated binder having a very high polymer content comprising a soft aromatic petroleum base, optionally a bituminous base and at least one polymer characterized in that the polymer content in the concentrated binder is greater than or equal to 20% by weight, preferably greater than or equal to 25% by weight, and the use thereof in the preparation of a dilute bitumen/polymer binder for the fields of road applications, in particular in the manufacture of road binders, and in the fields of industrial applications.

17 Claims, No Drawings

NON-GELLABLE AND PUMPABLE CONCENTRATED BINDER FOR BITUMEN/POLYMER

CROSS-REFERENCE TO RELATED APPLICATIONS

This application is a National Phase Entry of International Application No. PCT/FR2008/000896, filed on Jun. 25, 2008, which claims priority to French Application 07 04564, filed on Jun. 26, 2007, both of which are incorporated by reference herein.

FIELD OF INVENTION

The present invention relates to the field of bitumen/polymers. More specifically, it relates to concentrated binders for bitumen/polymers with very high polymer content. The invention also relates to the method for preparing these polymer-concentrated binders. The invention further relates to the use of these concentrated binders for preparing diluted bituminous binders intended for applications to the field of highways, notably in the production of binders for road surfaces, and to industrial application fields.

BACKGROUND TO THE INVENTION/PRIOR ART

The cross linkage, for example with sulfur, of polymers including insaturations, notably co-polymers of styrene and conjugated diene such as butadiene within the bitumen, lead to bitumen/polymer compositions having improved stability and excellent physico-mechanical properties. These bitumen/polymer compositions can be used for producing surfaces that have improved characteristics over those obtained from bitumens alone. The preparation of bitumen/polymer compositions of the above type for which the polymer able to be cross-linked using for example sulfur, is a copolymer of styrene and a conjugated diene is notably disclosed in FR2376188, FR2528439, EP0360656 and EP0299820.

The bitumen/polymer compositions from which, after dilution, bitumen/polymer binders are produced are also called "bitumen/polymer concentrates". These bitumen/polymer concentrates are more economical to prepare and transport than diluted bitumen/polymer compositions having a lower polymer content (as a lesser amount to transport means lower transport costs). Such concentrate can be diluted at the time of use, by adding bitumen, to obtain bitumen/polymer binders having a lower polymer content generally employed for producing surfacings. The bitumen/polymer concentrates are prepared with a polymer content below a certain threshold which can vary from about 3 to 6% by weight of bitumen. Indeed, once the polymer content of the bitumen/polymer concentrates exceeds the above threshold, there is a significant risk of the bitumen/polymer concentrates gelling in the course of their preparation or their storage. It is consequently difficult, in practice, to produce non gelling bitumen/polymer concentrates having a high polymer content. Furthermore, the bitumen/polymer concentrates are more viscous and consequently difficult to pump.

AIMS OF THE INVENTION

In view of the above, the present invention aims for the obtention of concentrated binders having a very high polymer content. Another aim of the invention is to provide concentrated binders with a very high polymer content with delayed gelling. A further aim of the invention is to provide concentrated binders with a very high polymer content which are stable to storage. A further aim of the invention is to provide concentrated binders with a very high polymer content which have reduced viscosity and which are consequently able to be pumped using conventional pumping systems.

A further aim of the invention is to provide concentrated binders having a very high polymer content making it possible to reduce transport and logistics costs. A further aim of the invention is to provide concentrated binders having a very high polymer content which can be easily diluted if necessary, using bitumens to produce diluted bitumen/polymer binders habitually employed for providing surface coatings and notably road surfacings. A further aim of the invention is to provide concentrated binders with a very high polymer content which, once diluted with bitumens, meet the established specifications. Further aims and advantages of the invention will appear through the description which follows.

SUMMARY OF THE INVENTION

Firstly, the present invention relates to a polymer-concentrated binder comprising a soft aromatic petroleum base, optionally a bituminous base and at least one polymer wherein the concentrated binder has a polymer content greater than or equal to 20% by weight, preferably greater than or equal to 25% by weight. Preferably, the concentrated binder comprises at least 50% by weight, preferably at least 70% by weight of soft aromatic base, preferably from 50 to 90% by weight. Preferably, the concentrated binder comprises from 0 to 30% by weight bituminous base, preferably from 1% to 25% by weight.

Preferably, the concentrated binder further comprises from 0 to 2% by weight, preferably from 0.1 to 0.5% anti-gelling agent. Preferably, the concentrated binder further comprises from 0 to 2% by weight cross-linking agent, preferably from 0.1 to 0.5%. Preferably, the concentrated binder further comprises from 0 to 20% by weight of a wax, preferably from 1 to 10%.

Preferably, the polymer comprises one or several copolymers based on conjugated diene units and aromatic monovinyl hydrocarbon units. Preferably, the conjugated diene is chosen from those having from 4 to 8 carbon atoms per monomer, for example butadiene, 2-methyl-1,3-butadiene (isoprene), 2,3-dimethyl-1,3-butadiene, 1,3-pentadiene and 1,2-hexadiene, chloroprene, carboxylated butadiene, carboxylated isoprene, in particular butadiene and isoprene, and mixtures thereof. Preferably, the aromatic monovinyl hydrocarbon is chosen from the group comprising styrene, o-methyl styrene, p-methyl styrene, p-tert-butylstyrene, 2,3 dimethyl-styrene, α-methyl styrene, vinyl naphtalene, vinyl toluene, vinyl xylene, and analogs and mixtures thereof, in particular styrene. Preferably, the polymer is a copolymer based on butadiene and styrene units.

Preferably, the weight percentage of styrene in the polymer is from 5 to 50%, preferably from 20 to 50%. Preferably, the weight content of butadiene in the polymer is from 50 to 95%. Preferably, the content by weight of 1-2 butadiene in the polymer is from 5 to 70%.

Preferably, the soft aromatic petroleum base comprises one or several aromatic petroleum cuts resulting from de-aromatization of petroleum cuts originating from the refining of crude oil, in particular petroleum cuts originating from vacuum distillation of crude oil and/or originating from the de-aromatization of lubricating bases. Preferably, the aromatic petroleum cuts have an aromatic cycle content greater than 50% by weight, preferably greater than 65% by weight and preferably from 50% to 80% by weight. Preferably, the aromatic petroleum cuts have kinematic viscosity greater than 5 mm$^2$/s at 100° C., preferably greater than 20 mm$^2$/s, preferably greater than 50 mm$^2$/s, preferably from 50 to 85 mm$^2$/s. Preferably, the aromatic petroleum cuts have a Cleveland flash point higher than 170° C., preferably higher than 200° C., preferably from 170° C. to 250° C.

Preferably, the bituminous base is chosen from among bitumens of natural origin, bitumens of synthetic origin and/or bitumens originating from the refining of crude oil. Preferably, the wax has a melting point higher than 90° C., preferably higher than 100° C., preferably from 90 to 150° C. Preferably, the wax is chosen from the group comprising the paraffins and the fatty acid amines. Preferably, the wax is a wax of polymethylene or polyethylene.

Preferably, the wax originates from the Fischer-Tropsch process and comprises from 30 to 100 carbon atoms. Preferably, the wax is ethylene-bis(stearamide) of formula $C_{17}H_{35}$—CONH—$CH_2$—$CH_2$—NHCO—$C_{17}H_{35}$.

Preferably, the anti-gelling agent is selected from nitrogenous compounds (CAZ) or metallic salts. Preferably, the anti-gelling agent is selected from CAZ nitrogen compounds having a molecular mass greater than 90, the reaction product between carboxylic acids such as formic acid and fatty chain polyalkylene polyamines of general formula (I): (I) R—NH—[$(CH_2)_n$—NH]$_m$—H in which R is a linear saturated and unsaturated hydrocarbon chain having from 8 to 22 carbon atoms, n is an integer from 1 to 5 and m is an integer from 1 to 5. Preferably, the anti-gelling agent is N-tallow amino-3 propyl-1 tetrahydro-1,4,5,6 pyrimidine.

Preferably, the cross-linking agent is chosen from the group comprising (i) sulfur-donating coupling agents, (ii) functionalizing agents selected from carboxylic acids or esters having thiol or disulphide groups and (iii) peroxide compounds generating free radicals. Preferably, the sulfur donating coupling agent is selected from the group consisting of elemental sulfur and hydrocarbyl polysulfides, sulfur donating vulcanization accelerators, mixtures of such products between themselves and/or with non-sulfur donating vulcanization accelerators. Preferably, the polymer-concentrated binder has a dynamic viscosity at 180° C. which is less than 3000 mPa·s, preferably from 800 to 1500 mPa·s.

Secondly, the invention provides a method for preparing concentrated binders as defined hereinabove comprising the steps of:

a) introducing a soft aromatic base and optionally a bituminous base into a vessel fitted with mixing means, and bringing the mixture up to a temperature comprised between 140 and 200° C., b) introducing at least 10% by weight of polymer and from 0 to 20% by weight of wax, c) heating the composition to a temperature comprised between 140 and 200° C., while stirring, until a homogeneous composition is obtained, d) introducing from 0 to 2% by weight anti-gelling agent and from 0 to 2% by weight cross-linking agent, e) heating the composition to a temperature comprised between 140 and 200° C., while stirring, until a homogeneous polymer-concentrated binder is obtained.

The invention further concerns the use of the concentrated binder according to the invention for preparing a diluted bitumen/polymer binder, obtained by diluting the polymer-concentrated binder of the invention with bitumen. The invention finally relates to the use of the concentrated binder as defined above for preparing a diluted bitumen/polymer binder comprising diluting said polymer concentrated binder with bitumen. Preferably, the use of the diluted bitumen/polymer binder directly or after emulsification thereof is aimed at providing surfacings, notably road surfacings of the surface dressing type, for producing cold or hot mix bituminous coatings, or for providing seal coatings. Preferably, the diluted bitumen/polymer binder, mixed with granular material, is used for producing a surface coating, a cold or hot mix bituminous coating, a cold poured coating, a gravel emulsion or a surface course. Preferably, the use of the diluted bitumen/polymer binder is for the production of a seal coating, a membrane or a prime coating.

DETAILED DESCRIPTION

The invention relates to polymer concentrated binders. The polymers employed according to the invention are those polymers conventionally usable in the bitumen/polymer field such as for example polybutadienes, polyisoprenes, butyl rubber, polyacrylates, polymetacrylates, polychloroprenes, polynorbornenes, polybutenes, polyisobutenes, polyethylenes, ethylene and vinyl acetate copolymers, ethylene and methyl acrylate copolymers, ethylene and butyl acrylate copolymers, ethylene and maleic anhydride copolymers, ethylene and glycidyl methacrylate copolymers, ethylene and glycidyl acrylate copolymers, ethylene and propene copolymers, ethylene/propene/diene (EPDM) terpolymers, acrylonitrile/butadiene/styrene (ABS) terpolymers, ethylene/acrylate or alkyl methacrylate/acrylate or glycidyle methacrylate terpolymers and notably ethylene/methyl acrylate/glycidyl methacrylate terpolymers and ethylene/acrylate or alkyl methacrylate/maleic anhydride terpolymers and notably ethylene/butyl acrylate/maleic anhydride terpolymers. The polymers can also be the polymers disclosed in the patents EP1572807, EP0837909 and EP1576058 of the applicant.

The preferred polymers are copolymers based on conjugated diene units and aromatic monovinyl hydrocarbon units. The polymers of the invention comprise one or several copolymers based on a conjugated diene units and aromatic monovinyl hydrocarbon units. The conjugated diene is chosen from those including from 4 to 8 carbon atoms per monomer, for example butadiene, 2-methyl-1,3-butadiene (isoprene), 2,3-dimethyl-1,3-butadiene, 1,3-pentadiene and 1,2-hexadiene, chloroprene, carboxylated butadiene, carboxylated isoprene, in particular, butadiene and isoprene and mixtures thereof. The aromatic monovinyl hydrocarbon is chosen among styrene, o-methyl styrene, p-methyl styrene, p-tert-butylstyrene, 2,3 dimethyl-styrene, α-methyl styrene, vinyl naphtalene, vinyl toluene, vinyl xylene, and analogs or mixtures thereof, in particular styrene.

More particularly, the polymer consists of one or several copolymers chosen among sequenced copolymers of styrene and butadiene, of styrene and isoprene, of styrene and chloroprene, of styrene and carboxylated butadiene or, yet again, of styrene and carboxylated isoprene. In particular, the polymer is a copolymer based on butadiene and styrene units. A copolymer of styrene and conjugated diene, in particular a copolymer of styrene and butadiene advantageously has a weight content of styrene ranging from 5 to 50%, preferably from 20 to 50%. The copolymer of styrene and conjugated diene, in particular the copolymer of styrene and butadiene advantageously has a weight content of butadiene (1-2 and 1-4) ranging from 50 to 95%. The copolymer of styrene and conjugated diene, in particular the copolymer of styrene and butadiene advantageously has a weight content of butadiene 1-2 ranging from 5 to 70%. The 1-2 butadiene units are units that result from 1-2 addition polymerisation of the butadiene units.

The average molecular mass of the styrene and conjugated diene copolymer, and notably that of the styrene and butadiene copolymer can for example be comprised between 10,000 and 500,000, preferably between 50,000 and 200,000 and more preferably from 50,000 to 150,000 daltons. The concentrated binder according to the invention comprises at least 20% by weight polymer, preferably at least 25% by weight. Preferably, the concentrated binder comprises from 20 to 40% by weight polymer, more preferably from 25 to 35% by weight or yet again 20 to 30% by weight polymer.

The concentrated binder according to the invention also includes an aromatic soft petroleum base which is essential for obtaining polymer concentrated binders according to the invention. The aromatic soft petroleum base comprises one or several aromatic petroleum cuts taken alone or as mixtures. These aromatic petroleum cuts are aromatic products coming from de-aromatization (or solvent extraction of aromatic compounds or products) of petroleum cuts originating from refining of crude oil, in particular petroleum cuts originating from vacuum distillation of crude and/or originating from de-aromatization (or solvent extraction of aromatic compounds or products) of lubricating bases. Such extraction of aromatic compounds is performed using a solvent such as furfural.

The aromatic petroleum cuts constituting the aromatic soft base are rich in aromatic compounds. Aromatic petroleum cuts have content in aromatic compounds or aromatic cycles greater than 50% by weight, preferably greater than 65% by weight. The high aromatic compound content makes it notably possible to render the polymer compatible in the aromatic soft base.

Additionally, the kinematic viscosity of the aromatic petroleum cuts constituting the aromatic soft base is greater than 5 mm$^2$/s at 100° C., preferably greater than 20 mm$^2$/s, preferably greater than 50 mm$^2$/s, preferably from 50 to 85 mm$^2$/s. These viscosities are fairly low, which allows the soft aromatic base to be relatively fluid. The Cleveland flash point of aromatic petroleum cuts is higher than 170° C., preferably higher than 200° C., preferably from 170° C. to 250° C. The concentrated binder according to the invention comprises at least 50% by weight, preferably at least 70% by weight of soft aromatic base, preferably from 50 to 90% by weight.

The concentrated binder according to the invention can optionally comprise a bituminous base. The latter is not necessary to obtain homogeneous and stable concentrated binders. The bitumen or mixture of bitumens according to the invention is advantageously selected from the various bitumens having a penetratability comprised between 0 and 500 1/10 mm. The binders according to the invention can contain bitumens originating from various origins. We can firstly mention bitumens of natural origin, those contained in natural bitumen deposits, natural asphalts or bituminous sands. The bitumens according to the invention are also bitumens originating from refining of crude oil. The bitumens originate from the atmospheric and/or vacuum distillation of petroleum. Such bitumens can also be optionally aerated, reduced in viscosity and/or de-asphalted. Finally, the bitumens of the invention can also be so-called "synthetic" bitumens, for instance synthetic clear binders able to be coloured by adding pigments. This can for instance involve petroleum resins or in indene-coumarone resins mixed with aromatic and/or paraffinic hydrocarbons. The concentrated hydrocarbonated binder according to the invention comprises from 0 to 30% by weight bituminous base, preferably from 1% to 25% by weight.

The concentrated binder according to the invention can also include waxes. Waxes participate in reinforcing binder diluted at low temperature and in fluidifying binder diluted at high temperature. The waxes employed in the invention are waxes with a melting point above 90° C., preferably above 100° C. The waxes can be of petroleum, animal or vegetable origin or originate from the chemical industry. Preferred waxes are the paraffins or fatty acid amides.

The paraffins are notably chosen from among the polyalkylenes. Preferably, the invention will employ poly-methylene paraffins and polyethylene paraffins. Preferably, the paraffins have chain lengths comprised between 40 and 100 carbon atoms. In one preferred embodiment of the invention, the paraffins employed are synthetic paraffins originating from biomass and/or natural gas conversion.

In a preferred embodiment of the invention, the paraffins are paraffins of poly-methylene, in particular synthetic paraffins of poly-methylene, particularly originating from synthesised gas conversion by Fischer-Tropsch process. In another preferred embodiment of the invention, the waxes employed are amides, bis-amides or polyamides of fatty acids. The fatty acid amides are fatty acid amides with a number of carbon atoms greater than or equal to 18, notably selected from the stearamides, the oleamides, the erucamides, the palmitamides. Preferred is ethylene-bis(stearamide) of formula $C_{17}H_{35}$—CONH—$CH_2$—$CH_2$—NHCO—$C_{17}H_{35}$. The concentrated binder according to the invention comprises from 0 to 20% by weight wax, preferably from 1 to 10% or more preferably from 2 to 5% by weight.

The concentrated binder according to the invention optionally includes an anti-gelling agent. Anti-gelling agents that may be used in the invention can be nitrogenous compounds or metal salts. These anti-gelling agents are not indispensable to obtain homogeneous and stable concentrated binders according to the invention. They can however be added as a supplement, to slow down a little more the gelling.

The nitrogenous compounds have a molecular weight higher than 90 and are chosen among reaction products of carboxylic acids such as formic acid and polyalkylene polyamines having fatty chain(s) of general formula (I):

$$R\text{—}NH\text{—}[(CH_2)_n\text{—}NH]_m\text{—}H \quad\quad (I)$$

in which R is a linear, saturated or unsaturated hydrocarbon chain having from 8 to 22 carbon atoms, n is an integer from 1 to 5 and m is an integer from 1 to 5.

The preparation of the nitrogenous compounds is disclosed in the French patent FR2259824. Preferably, the nitrogenous compound is a complex mixture of products that may include unmodified amine groups and/or amide groups and/or elements of cyclic formamidine structure of the tetrahydropyrimidine type obtained, firstly, from a carboxylic group supplied by the formic acid and, secondly, from the terminal primary amine group and secondary amine group that is the closest, supplied by the above defined fatty chain polyalkylene polyamines of formula (I). As examples of such nitrogenous compounds, we can mention, without this being limiting, decenyl-9 amine, dodecenyl-9 amine, hexadecenyl-9 amine, octadecenyl-6 amine, oleylamine or octadecenyl-9 amine, decatrienyl-2,4,6 amine, octadeca-trienyl-9,12,15 amine, propylene diamine tallow hydrochloride, propylene-triamine tallow hydrochloride, N,N-dimethyloleylamide, N,N-diethyloleylamide, l'oleyl-2 (hydroxy-2 ethyl)-1 imidazoline, amine of tallow, amine of copra, propylene triamine tallow. One preferred nitrogenous compound is N-tallow amino-3 propyl-1 tetrahydro-1,4,5,6 pyrimidine, available on the market as Polyram L200® from the company CECA.

The anti-gelling agent can also contain metallic salts. The metals of the metallic salts according to the invention are chosen from zinc, cadmium, mercury, copper, silver, nickel, platinum, iron, magnesium, calcium and mixtures thereof. Among salts suitable for the invention, we can mention the carboxylates, nitrates, carbonates, hydrates, halides, phosphates, perchlorates, sulphates, sulphonates, oxides, stearates, naphthenates, citrates and mixtures thereof. We can for example mention the zinc oxides, calcium oxides, magnesium oxides, iron oxides, copper oxides, zinc stearates, calcium palmitates, magnesium citrates. The concentrated hydrocarbonated binder according to the invention comprises from 0 to 2% by weight of anti-gelling agent, preferably from 0.1 to 0.5%.

Where the polymer of the invention is selected from crosslinkable polymers, a cross-linking agent is employed to ensure and/or facilitate cross-linking. This cross-linking agent can be of a highly varied nature and is selected as a function of the type or types of polymer(s) contained in the concentrated binder according to the invention. The cross-linking agent is selected from the group consisting of (i) sulfur donating coupling agents, (ii) functionalizing agents chosen from carboxylic acids or esters having thiol or disulphide groups and (iii) free radical generating peroxide compounds.

The sulfur donating coupling agent used for producing a cross-linked concentrated binder can consist of a product selected from the group consisting of elemental sulfur, hydrocarbyl polysulphides, sulfur-donor vulcanisation accelerators, mixtures of the above with each other and/or with non-sulfur donating vulcanisation accelerators. The sulfur donating coupling agent, the elemental sulfur, hydrocarbyl polysulphides, sulfur-donor vulcanization accelerators and vulcanization accelerators which are not sulfur donors able to be used are described in patent EP797629 in paragraphs [14] to [24]. The content of those paragraphs is incorporated herein by reference.

The functionalizing agent used for producing a concentrated binder is described in European patent EP0907686 on page 3, line 33 to page 11 line 28. The content of these lines is incorporated herein by reference. The peroxydized compound able to be used is described in European patent EP907686 on page 11, line 29 to page 12, line 2. The content of these lines is incorporated herein by reference. The concentrated binder according to the invention comprises from 0 to 2% by weight cross-linking agent, preferably from 0.1 to 0.5%. The formulation of the concentrated binder according to the invention allows the concentrated binder to exhibit retarded gelling and also to be pumpable, as it has a dynamic viscosity at 180° C. of less than 3000 mPa·s, preferably comprised between 500 and 2000 mPa·s or yet again between 800 and 1500 mPa·s.

EXAMPLES

Concentrated binders as controls as well as concentrated binders according to the invention were prepared in order to evaluate the influence of each of the constituents on the physico-mechanical characteristics of the polymer concentrated binders. The constituents and content of the various constituents of concentrated binders 1 to 5 are given in table 1 below, content being expressed in percentage:

TABLE 1

| Binder | 1 | 2 | 3 | 4 | 5 |
|---|---|---|---|---|---|
| Soft aromatic base | 62 | 0 | 69.4 | 62.2 | 51 |
| Bitumen | 17.4 | 79.4 | 0 | 17.5 | 23.4 |
| Polymer | 20 | 20 | 30 | 20 | 20 |

TABLE 1-continued

| Binder | 1 | 2 | 3 | 4 | 5 |
|---|---|---|---|---|---|
| Wax | 0 | 0 | 0 | 0 | 5 |
| Anti-gelling agent | 0.3 | 0.3 | 0.3 | 0 | 0.3 |
| Cross-linking agent | 0.3 | 0.3 | 0.3 | 0.3 | 0.3 |

The soft aromatic base is a soft base having a kinematic viscosity at 100° C. of 70 mm$^2$/s and a Cleveland flash point above 230° C.

The bitumen is bitumen of penetrability equal to 45 according to standard EN1426.

The polymer is a disequenced copolymer of styrene and butadiene such as Dynasol 540.

The wax is ethylene-bis(stearamide).

The anti-gelling agent is Polyram L200®.

The cross-linking agent is sulfur.

The following operating conditions applied: The soft aromatic base and the bitumen were introduced into a reactor kept at 185° C. under stirring. The soft aromatic base/bitumen mixture was kept stirred for one hour, after which the polymer and the wax were added. The content of the reactor was then kept at 185° C. with stirring for 15 hours until a homogeneous mass was obtained. Next, the anti-gelling agent and then the sulfur were added. The reaction medium thus formed was kept at 185° C. per 6 hours to produce the concentrated binders 1 to 5.

Results

TABLE 2

| Binder | 1 | 2 | 3 | 4 | 5 |
|---|---|---|---|---|---|
| Penetrability (0.1 mm) (a) | 88 | 30 | 72 | 80 | 50 |
| TBA (° C.) (b) | 75 | >130 | 82.2 | >130 | 125 |
| IP (c) | 5.31 | >10 | 5.67 | >10 | 8.7 |
| Dynamic viscosity at 180° C. (mPa · s) (d) | 1318 | Not measurable gel | 2257 | 1206 | 1052 |
| Gelling performance (e) | S3 after 14 days | S4 upon leaving reactor | S3 after 14 days | S3 after 8 days | S3 after 5 days |

(a) According to standard EN 1426
(b) Ball and ring temperature according to standard EN1427
(c) Pfeiffer penetrability index calculated as follows:

$$IP = \frac{1952 - 500 \times \log(P_{25}) - 20 \times TBA}{50 \times \log(P_{25}) - TBA - 120}$$

(d) According to standard ASTM D2171
(e) The gelling test consisted in letting a 1 kg tin of binder stand at 180° C. At each time of measurement, a wooden strip was dipped into the tin and the manner in which the binder flowed was examined. A scale from 0 to 4 allowed the state of the binder to be described.
S0: Binder fluid, flowed drop by drop.
S1: Binder liquid: flowed in a thin continuous thread
S2: Binder viscous: flowed in a wide continuous thread
S3: Binder highly viscous: flowed as a continuous sheet
S4: Binder solid.
We shall consider that a binder has gelled when it reaches state S3. One can then measure the storage time needed to reach this state.

Concentrated binders 1 and 2 are both concentrated at 20% polymer. Concentrated binder 1 is stable over several days. Concentrated binder 1 only becomes highly viscous after 14 days, gelling thereof is retarded. Additionally, concentrated bided 1 has a viscosity allowing it to be pumped at a temperature below 180° C. (1318 mPa·s). Concentrated binder 2 immediately gelled when it left the reactor, and its viscosity was not measurable. Concentrated binder 2 gelled very quickly and was not pumpable. To obtain a stable concentrated binder, these two examples demonstrate that the presence of the soft aromatic base according to the invention is indispensable. Without this soft aromatic base, it is impossible to obtain binders concentrated at 20% polymer.

However, as example 3 shows, the bitumen base is not indispensable. It is possible to obtain a binder 3 concentrated at 30% polymer, which is stable for several days. Concentrated binder 3 only becomes highly viscous after 14 days and has a viscosity allowing pumping at a temperature below 180° C. (2257 mPa·s).

If we look at example 4, it is not indispensable to add an anti-gelling agent to obtain concentrated binders that are stable but several days and pumpable. This anti-gelling agent can nevertheless be added to the concentrated binders to retard the gelling phenomenon a bit more. To check whether the concentrated binders of the invention can lead to diluted bituminous binders that meet the specifications, concentrated binders 1 and 5 were diluted with 35/50 grade bitumen until two bituminous binders, A and B, diluted at 3% polymer were obtained.

TABLE 3

| Binder | A | B |
|---|---|---|
| Penetrability (0.1 mm) (a) | 67 | 39 |
| TBA (° C.) (b) | 56 | 56 |
| IP (c) | 0.96 | −0.25 |
| Elastic recovery (%) (f) | 91 | 61 |
| Dynamic viscosity at 180° C. (mPa·s) (d) | 190 | 42 |
| Maximum elongation at 5° C. (%) (g) | >700 | 500 |
| Storage stability ΔTBA (° C.) (h) | 0.2 | 0.4 |
| Gelling performance (e) | S0 after 14 days | S0 after 14 days |

(a) According to standard EN 1426
(b) Ball and ring temperature according to standard EN1427
(c) Pfeiffer penetrability index calculated as follows:

$$IP = \frac{1952 - 500 \times \log(P_{25}) - 20 \times TBA}{50 \times \log(P_{25}) - TBA - 120}$$

(d) According to standard ASTM D2171
(e) The gelling test consisted in letting a 1 kg tin of binder stand at 180° C. At each time of measurement, a wooden strip was dipped into the tin and the manner in which the binder flowed was examined. A scale from 0 to 4 allowed the state of the binder to be described.
S0: Binder fluid, flowed drop by drop.
S1: Binder liquid: flowed in a thin continuous thread
S2: Binder viscous: flowed in a wide continuous thread
S3: Binder highly viscous: flowed as a continuous sheet
S4: Binder solid.
We shall consider that a binder has gelled when it reaches state S3. One can then measure the storage time needed to reach this state.
(f) According to standard NF T66-040
(g) Tractional test at 5° C., with a stretching speed of 500 mm/min according to standard NF EN 13587.
(h) Test for 3 days at 180° C. according to standard NF EN 13399.

Examples A and B demonstrate that the diluted binders obtained from the concentrated binders according to the invention have satisfactory characteristics in line with the usual requirements for a bitumen-polymer mixture. In particular, diluted binders A and B have satisfactory elastic properties. Example B shows that it is possible to add paraffins to the binders according to the invention in order to reinforce the diluted binder at low temperature and aid fluidification of the diluted binder at high temperature.

The invention claimed is:

1. A polymer-concentrated binder comprising:
   at least 70% by weight of a soft aromatic petroleum base comprising at least one aromatic petroleum cut, taken alone or as a mixture, from de-aromatization of petroleum cuts originating from the refining of crude oil;
   at least one polymer consisting of one or several copolymers based on conjugated diene units and aromatic monovinyl hydrocarbon units; and
   optionally a bituminous base,
   wherein the polymer-concentrated binder has a polymer content greater than or equal to 20% by weight.

2. The polymer-concentrated binder according to claim 1, wherein the concentrated binder comprises from 0 to 30% by weight of bituminous base.

3. The polymer-concentrated binder according to claim 1, wherein the concentrated binder further comprises from 0 to 2% by weight of anti-gelling agent.

4. The polymer-concentrated binder according to claim 1, wherein the concentrated binder further comprises from 0 to 2% by weight of a cross-linking agent.

5. The polymer-concentrated binder according to claim 1, wherein the concentrated binder further comprises from 0 to 20% by weight of a wax.

6. The polymer-concentrated binder according to claim 1, wherein the soft aromatic petroleum base comprises one or several aromatic petroleum cuts resulting from de-aromatization of petroleum cuts originating from the refining of crude oil, in particular petroleum cuts originating from vacuum distillation of crude oil and/or originating from the de-aromatization of lubricating bases.

7. The polymer-concentrated binder according to claim 6, wherein the aromatic petroleum cuts have an aromatic cycle content greater than 50% by weight.

8. The polymer-concentrated binder according to claim 5, wherein the wax is chosen from paraffins or fatty acid amides.

9. The polymer-concentrated binder according to claim 4, wherein the cross-linking agent is chosen from the group consisting of (i) sulfur-donating cross-linking agents, (ii) functionalizing agents selected from carboxylic acids or esters having thiol or disulphide groups, and (iii) peroxide compounds generating free radicals.

10. A method for preparing polymer-concentrated binders according to claim 1, comprising:
    a) introducing a soft aromatic base and optionally a bituminous base into a vessel fitted with a mixer, and bringing the mixture up to a temperature comprised between 140 and 200° C.,
    b) introducing at least 10% by weight of polymer and from 0 to 20% by weight of wax,
    c) heating the composition to a temperature comprised between 140 and 200° C., while stirring, until a homogeneous composition is obtained,
    d) introducing from 0 to 2% by weight of anti-gelling agent and from 0 to 2% by weight of cross-linking agent, and
    e) heating the composition to a temperature comprised between 140 and 200° C., while stirring, until a homogeneous concentrated binder is obtained.

11. A method for preparing a diluted bitumen/polymer binder, comprising:
    diluting a polymer-concentrated binder according to claim 1 with bitumen.

12. A method for producing a surface dressing, a cold or hot mix bituminous coating, a cold poured coating, a gravel emulsion or a surface course, the method comprising:
    mixing granular material with a diluted bitumen/polymer binder obtained by the method according to claim 11.

13. The polymer-concentrated binder according to claim 1, wherein the soft aromatic petroleum base comprises at least one aromatic petroleum cut resulting from de-aromatization of cuts originating from vacuum distillation of crude oil and/or originating from the de-aromatization of lubricating bases.

14. A cold mix bituminous coating comprising a diluted bitumen/polymer binder obtained by the method according to claim 11.

15. A hot mix bituminous coating comprising a diluted bitumen/polymer binder obtained by the method according to claim 11.

16. A seal coating comprising a diluted bitumen/polymer binder obtained by the method according to claim 11.

17. A surface comprising a diluted bitumen/polymer binder obtained by the method according to claim 11.

* * * * *